March 13, 1934.    R. CHILTON    1,950,971
REDUCTION GEAR
Filed Jan. 14, 1932    2 Sheets-Sheet 1
Fig. 1.
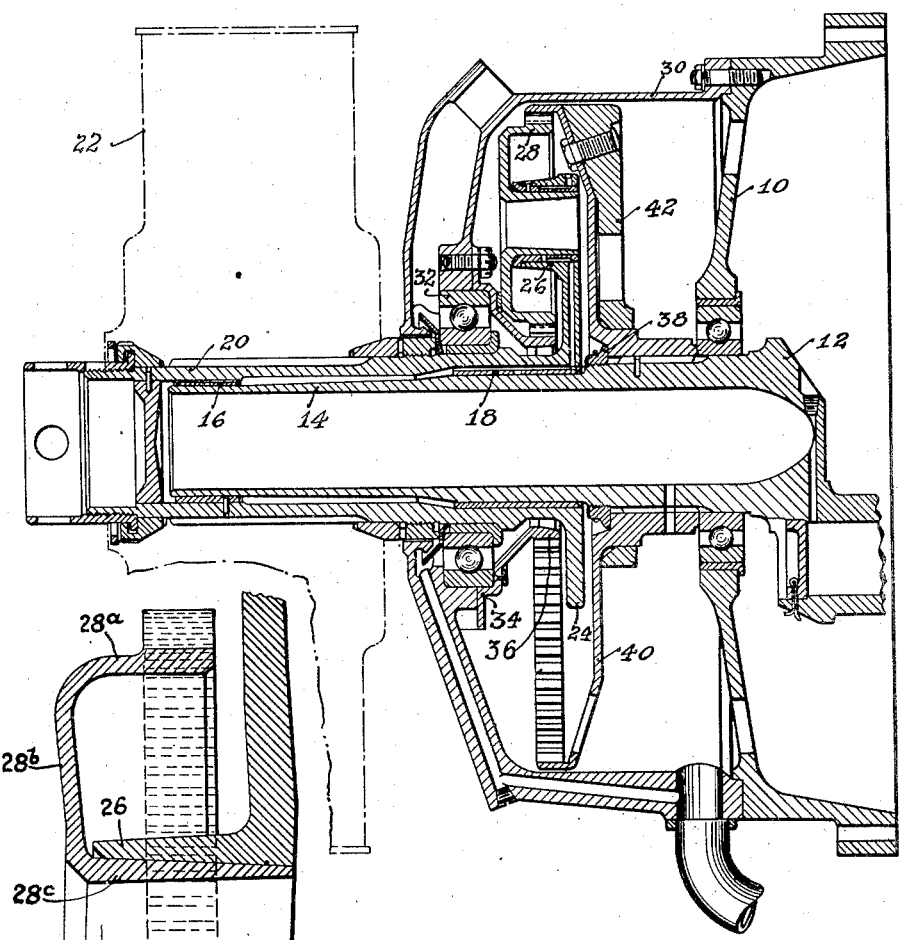
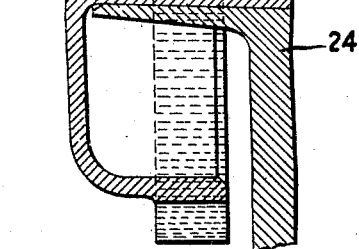
Fig. 2.
INVENTOR
ROLAND CHILTON
BY
ATTORNEY March 13, 1934.  R. CHILTON  1,950,971
REDUCTION GEAR
Filed Jan. 14, 1932   2 Sheets-Sheet 2

INVENTOR
ROLAND CHILTON
BY
ATTORNEY

Patented Mar. 13, 1934

1,950,971

UNITED STATES PATENT OFFICE 1,950,971

REDUCTION GEAR

Roland Chilton, Ridgewood, N. J., assignor to Wright Aeronautical Corporation, Paterson, N. J., a corporation of New York Application January 14, 1932, Serial No. 586,601

4 Claims. (Cl. 74—34)

This invention relates to reduction gears in general and particularly to planetary reduction gears for aircraft engines.

A prime object of the invention is to provide a planetary type of gear of decreased length and weight. A further object is to provide a gear wherein the tooth loads may be uniformly distributed over a plurality of planet gears in spite of the usual manufacturing dimensional tolerances. This object is obtained by a new and improved organization wherein the natural deflections in the parts themselves afford sufficient elastic yield without recourse to additional spring or articulated compensating means. An associated object is to provide for equal and opposite angular deflections in the pinions and their supports so that the teeth shall remain in parallel contact throughout the range of deflection. A further object is to permit the use of a simplified form of planet support member.

Aircraft engine gears, where the ratios run from 1.3:1 to 1.7:1; lend themselves to the disposition of planetary gearing wherein the large or annular gear is driven by the crankshaft and the planets are mounted in a cage organized for rotation with the driven member or propeller. In this case a fixed sun-wheel is used. It will be appreciated that in this disposition, wherein the driving gear is the largest member, the tooth pressures are thereby materially reduced and in the range of ratios quoted a minimum of five planet pinions may be used, which again reduces the tooth loading.

The simplest form of planet cage consists of cantilever gear supports springing from a single side plate, but, as usually organized, the deflections in such cantilever constructions produce tipping deflections at the gears, causing corner contact of the teeth. In the present invention accordingly a double cantilever system is used, the pinions themselves being organized with their journals to deflect in equal amount but in the opposite angular sense to the supporting member or cage, so that the algebraic sum of the angular deflections is zero, while the gross linear deflection is the sum of the separate deflections of the planets and their supports whereby overloading of one planet due to unavoidable constructural errors is avoided.

In the drawings:

Fig. 1 is a longitudinal axial section of the gear;

Fig. 2 is a detailed section showing in exaggerated degree the relative deflections of the gears and supports.

Figure 3:
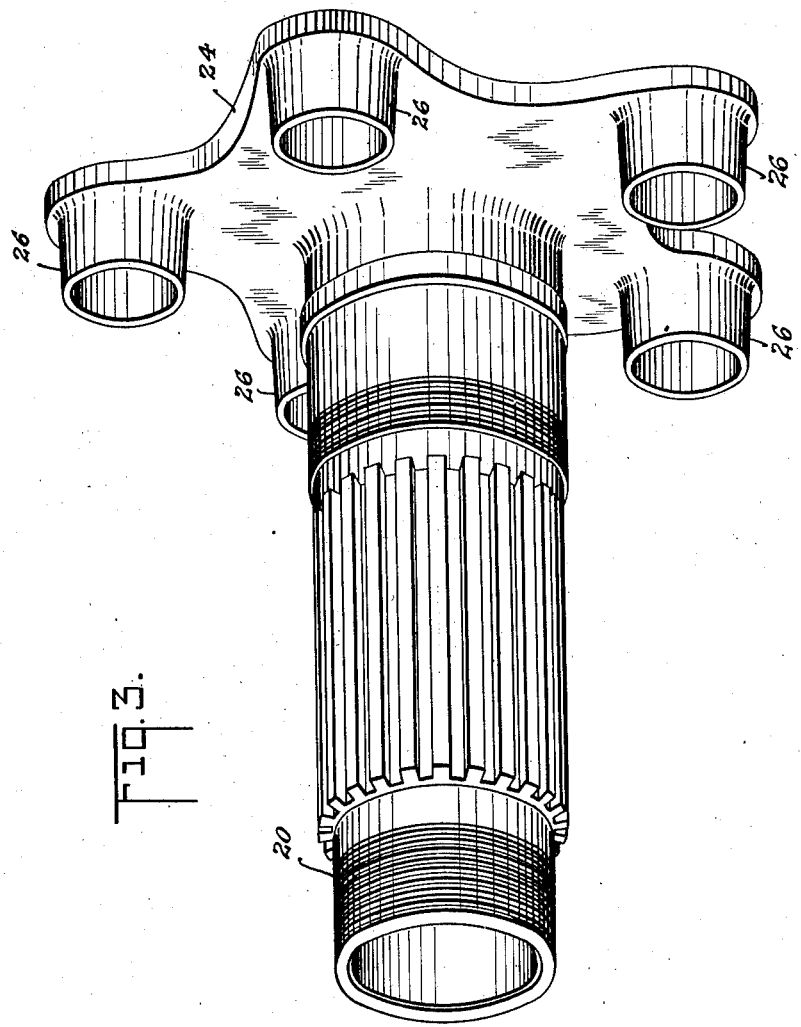
Fig. 3 is a perspective view of the propeller shaft member.

Referring first to Fig. 1, 10 designates the crankcase, and 12 part of the crankshaft of a conventional aircraft engine, the shaft being extended at 14 to provide journals for the bushings 16 and 18 of the propeller drive shaft 20, to which is suitably secured the propeller hub indicated by dot and dash lines at 22. The propeller shaft 20 has formed on it a preferably integral flange or backplate 24, provided with forwardly turned bosses 26 in which are journaled the planetary gears 28. This combined propeller shaft and planet cage member (20, 24 and 26) is shown in enlarged perspective view in Fig. 3. The gear is housed in an engine nose piece 30 provided with a propeller thrust bearing 32 which is clamped by the flange 34 of the fixed or sun gear 36. Secured to the crankshaft, as by splines and the nut 38, is the large internal driving gear 40 with which the planet gears 28 are also meshed. In the case of radial engines the counterweight 42 may be conveniently secured to the back of this gear.

It will be seen that the propeller driving reactions on the planet gear bearings are tangential to their path of rotation, and in Fig. 2 there is shown in much exaggerated degree the resulting deflections. Each planet gear comprises a rim 28a, a backplate 28b, and a hollow journal 28c. It will be seen that the load on the journal 28c is equal and opposite to the sum of the tooth loads of the planet gear with the annular driving gear 40 and the fixed sun gear 36, and the flexibility of the elements of each planet gear is so proportioned as to develop appreciable elastic yield under these loads, which yield will involve an angular error between the journal element 28c and the rim element 28a. Corresponding flexibility, however, is provided in the bearing boss 26 and the backplate 24, the parts being so proportioned that the angular deflections are equal but opposite, so that the rim 28a will remain in parallelism with the undistorted axis of the bearing boss 26 since the angular effects of the deflections cancel out, whereas the linear deflections in the tangential direction add together producing the deflection shown in exaggerated scale by the dimension D in the diagram of Fig. 2.

Assuming that the maximum spacing errors in the bores of the planet bearing bosses 26 can be held within plus or minus one thousandths of an inch, and the stiffness of the members is such that the deflection D under normal working load amounts to say five thousandths of an inch, then it will be seen that the error from equal tooth load distribution between the several planets will be plus and minus one fifth of the working load.

In the prior art cantilever supports for planet gears have been avoided because the angular deflections cause misalignment and corner loading of the teeth, but it will be obvious that by forming each planet gear with a journal comprising a cantilever of similar but opposite angular flexibility, the linear deflection between the gear rim and the support is doubled, while the angular deflections cancel out. It will also be obvious that the simple one piece planet cage comprising the plate 24 and the cantilever bosses 26 is much cheaper and lighter than the conventional construction wherein double sided planet supports are necessary to avoid angular deflections in the absence of compensating deflections in the planets themselves.

In the prior art, bearings mounted on additional spring elements have been used in order to compensate for constructional errors, and such additional springs are necessarily massive. It will be seen that the material in the gears and supporting members themselves are herein utilized to afford the desired elastic yield.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In a gear mechanism, in combination, a cantilever journal member engaging a cantilever bearing member, a gear from which one said member extends, and a support from which the other said member extends, said journal member and bearing member extending in opposed directions for effecting additive linear deflection and for cancelling angular deflections under load.

2. A planetary reduction gear comprising an annular driving gear, a fixed sun gear, planet gears engaged therebetween each having a rim and a journal extending on the same side of an offset web, and a carrier for said planets having bearing bosses extending from a backplate.

3. In a gear mechanism, a gear having an overhung journal, a support having an overhung bearing, said bearing cooperating with said journal, so that angular deflection of said journal is compensated by equal and opposite angular deflection of said bearing, thereby holding said gear in rectilinear relation with said support under all load conditions.

4. In a gear train in combination, a cantilever journal member engaging a cantilever bearing member, said members extending respectively in opposite directions from a gear and a support, said journal member and said bearing member being adapted for equal and opposite angular deflection under load for retaining the rectilinear relation of said gear and said support, and the deflections of said members being equal and additive in the rectilinear movement of said gear with respect to said support.

ROLAND CHILTON.